United States Patent
Arai

(10) Patent No.: US 10,742,081 B2
(45) Date of Patent: Aug. 11, 2020

(54) ROTOR AND MOTOR

(71) Applicant: FANUC CORPORATION, Yamanashi (JP)

(72) Inventor: Leo Arai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 185 days.

(21) Appl. No.: 16/156,484

(22) Filed: Oct. 10, 2018

(65) Prior Publication Data

US 2019/0123606 A1    Apr. 25, 2019

(30) Foreign Application Priority Data

Oct. 20, 2017    (JP) .................. 2017-203598

(51) Int. Cl.
*H02K 1/27* (2006.01)
*H02K 1/28* (2006.01)

(52) U.S. Cl.
CPC .............. *H02K 1/276* (2013.01); *H02K 1/28* (2013.01)

(58) Field of Classification Search
CPC ............ H02K 1/276; H02K 1/28; H02K 1/30; H02K 16/02
USPC ...................... 310/156.56, 216.113
See application file for complete search history.

(56) References Cited

FOREIGN PATENT DOCUMENTS

| CN | 102684379 A | 9/2012 |
|---|---|---|
| CN | 204886469 U | 12/2015 |
| JP | S6113546 U | 1/1986 |
| JP | 2004343886 A | 12/2004 |
| JP | 2005318765 A | 11/2005 |
| JP | 2007-282392 A | 10/2007 |
| JP | 2008-289286 A | 11/2008 |
| JP | 2010119192 A | 5/2010 |
| JP | 2012213310 A | 11/2012 |
| JP | 2017189003 A | 10/2017 |
| WO | 90/01825 A1 | 2/1990 |

OTHER PUBLICATIONS

An Office Action mailed by the Japanese Patent Office dated May 28, 2019, which corresponds to Japanese Patent Application No. 2017-203598 and is related to U.S. Appl. No. 16/156,484; with English translation.
An Office Action mailed by the Japanese Patent Office dated Aug. 27, 2019, which corresponds to Japanese Patent Application No. 2017-203598 and is related to U.S. Appl. No. 16/156,484.

(Continued)

*Primary Examiner* — Forrest M Phillips
(74) *Attorney, Agent, or Firm* — Studebaker & Brackett PC

(57) ABSTRACT

A rotor includes: cylindrical rotor core blocks fixed to the rotary axis to be adjacent in an axial direction, the rotor core blocks including insertion portions disposed at intervals in an end surface in the axial direction so as to extend in the axial direction, and slots disposed at intervals in a circumferential direction so as to extend in the axial direction, the insertion portions of adjacent rotor core blocks facing each other and being successive to each other, and the slots facing each other and being successively each other; fixing pins having elasticity in an orthogonal planar direction orthogonal to the axial direction, the fixing pins being inserted to the insertion portions facing each other in the axial direction to fix the rotor core blocks to be adjacent in an axial direction; and magnets disposed in the slots to extend across the rotor core blocks.

4 Claims, 5 Drawing Sheets

(56) References Cited

OTHER PUBLICATIONS

An Office Action mailed by the State Intellectual Property Office of the People's Republic of China dated Dec. 31, 2019, which corresponds to Chinese Patent Application No. 201811210282.2 and is related to U.S. Appl. No. 16/156,484. with English language translation.

ROTOR AND MOTOR

This application is based on and claims the benefit of priority from Japanese Patent Application No. 2017-203598, filed on 20 Oct. 2017, the content of which is incorporated herein by reference.

BACKGROUND OF THE INVENTION

Field of the Invention

The present invention relates to a rotor and a motor.

Related Art

Conventionally, a rotor in which a rotor core obtained by stacking an annular (disk-shaped) electromagnetic steel sheet in an axial direction is fixed to a rotary axis (a shaft) is known as one of rotors of a motor. The electromagnetic steel sheet has magnetic anisotropy, and therefore, simply stacking electromagnetic steel sheets may result in formation of an unnecessary magnetic orientation in a rotor. In addition to the magnetic orientation, the number of slots in a stator, a shape of the stator, and magnetic anisotropy of the stator may affect each other to deteriorate cogging torque and to impair smoothness of feeding of a motor.

In order to avoid this, as a first method, electromagnetic steel sheets may be stacked while being rotated by a predetermined angle one by one, and a magnet is fitted to a through-hole formed in the electromagnetic steel sheets to obtain a rotor core (for example, see Patent Document 1). The obtained rotor core is press-fitted to a rotary axis.

Alternatively, as a second method, a rotor core may be divided to obtain a plurality of rotor core blocks. A magnet corresponding to the divided size is used. In this case, the plurality of divided and obtained rotor core blocks are stacked while being rotated and are press-fitted to a rotary axis.

Patent Document 1: Japanese Unexamined Patent Application, Publication No. 2007-282392

SUMMARY OF THE INVENTION

According to the first methods, since electromagnetic steel sheets are stacked by being rotated one by one, the number of steps increases as the number of electromagnetic steel sheets and it is difficult to obtain a satisfactory hit rate. Moreover, dedicated facility for rotating the electromagnetic steel sheets is necessary.

Generally, although the number of magnets is very small, the second method requires a number of magnets corresponding to a multiplication of the number of poles and the number of divisions of the rotor core blocks, and as a result, the number of steps increases.

The present invention has been made in view of the above-described problems, and an object thereof is to provide a rotor and a motor capable of decreasing the number of steps during manufacturing.

(1) The present invention provides a rotor (for example, a rotor 10 to be described later) including: a plurality of cylindrical rotor core blocks (for example, a first rotor core block 12 and a second rotor core block 13 to be described later) disposed to be adjacent in an axial direction (for example, an axial direction D1 to be described later) of a rotary axis (for example, a rotary axis 11 to be described later) and fixed to the rotary axis, the rotor core blocks including insertion portions (for example, insertion portions 121 and 131 to be described later) disposed at intervals in an end surface in the axial direction of the rotor core blocks so as to extend in the axial direction, and slots (for example, slots 122 and 132 to be described later) disposed at intervals in a circumferential direction (for example, a circumferential direction D2 to be described later) so as to extend in the axial direction, the insertion portions of the adjacent rotor core blocks facing each other and being successive to each other, and the slots of the adjacent rotor core blocks facing each other and being successive to each other; a plurality of fixing pins (for example, fixing pins 14 to be described later) having elasticity in an orthogonal planar direction orthogonal to the axial direction, the fixing pins being inserted to both insertion portions facing each other in the axial direction to fix the rotor core blocks to be adjacent in the axial direction; and a plurality of magnets (for example, magnets 15 to be described later) disposed in the slots to extend across the plurality of rotor core blocks.

(2) The rotor according to (1) may include a resin (for example, a resin 16 to be described later) filled into the slot in which the magnet are disposed to block a gap between the magnet and the slot, wherein the slot may include: a slot body (for example, a slot body 1221, 1321 to be described later) which, when seen in the axial direction, has a shape corresponding to a cross-sectional shape when seen in the axial direction of the magnet and in which the magnet is disposed; and an ear portion (for example, an ear portion 1222, 1322 to be described later) which has a smaller width (for example, a width W11, W21 to be described later) than the slot body and extends in the circumferential direction or a radial direction (for example, a radial direction D3 to be described later) from an end in the circumferential direction of the slot body and in which the resin is filled.

(3) In the rotor according to (2), the insertion portion may have a perfect circular shape when seen in the axial direction, and the fixing pin may have a C-shape when seen in the axial direction.

(4) The present invention provides a motor (for example, a motor 1 to be described later) including: the rotor according to any one of (1) to (3); and a cylindrical stator (for example, a stator 20 to be described later) in which the rotor is disposed.

According to the present invention, it is possible to provide a rotor and a motor capable of decreasing the number of steps during manufacturing.

DETAILED DESCRIPTION OF THE INVENTION

Hereinafter, an embodiment of a rotor and a motor according to the present invention will be described with reference to FIGS. 1, 2, 3, and 4.

Figure 1:
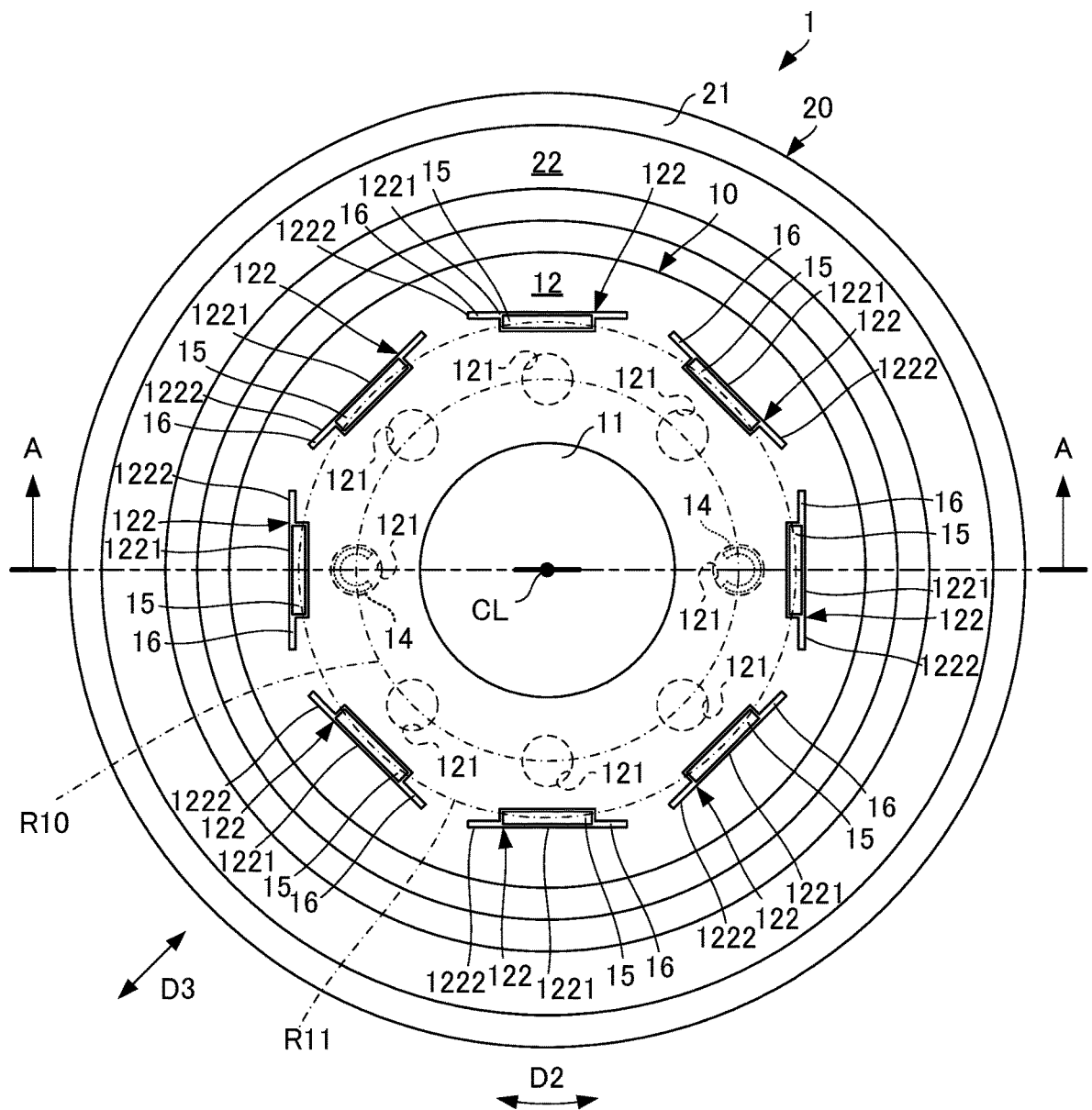
FIG. 1 is a front view illustrating a schematic configuration of a motor according to an embodiment of the present invention.
Figure 2:
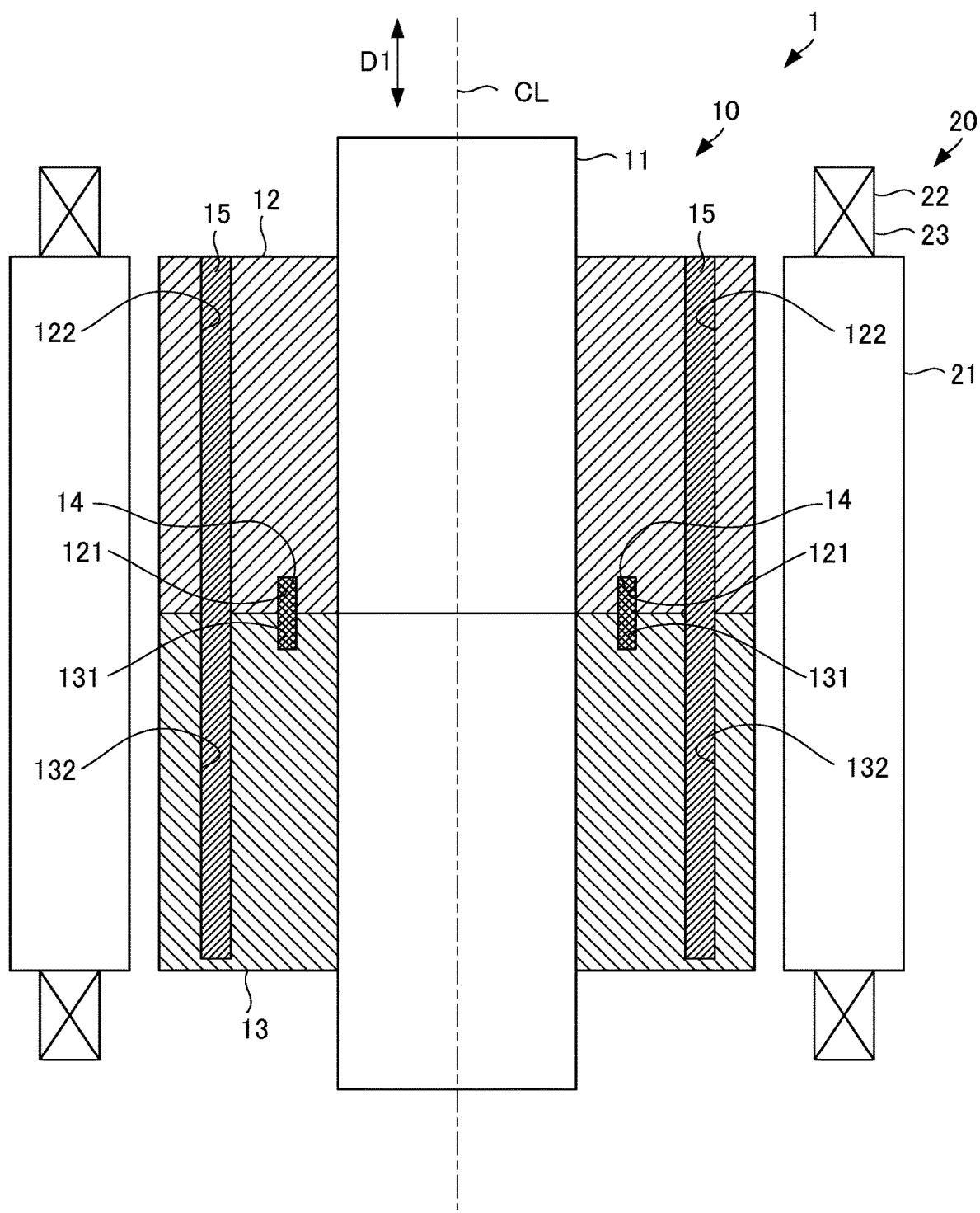
FIG. 2 is a cross-sectional view along line A-A in FIG. 1.
Figure 3:
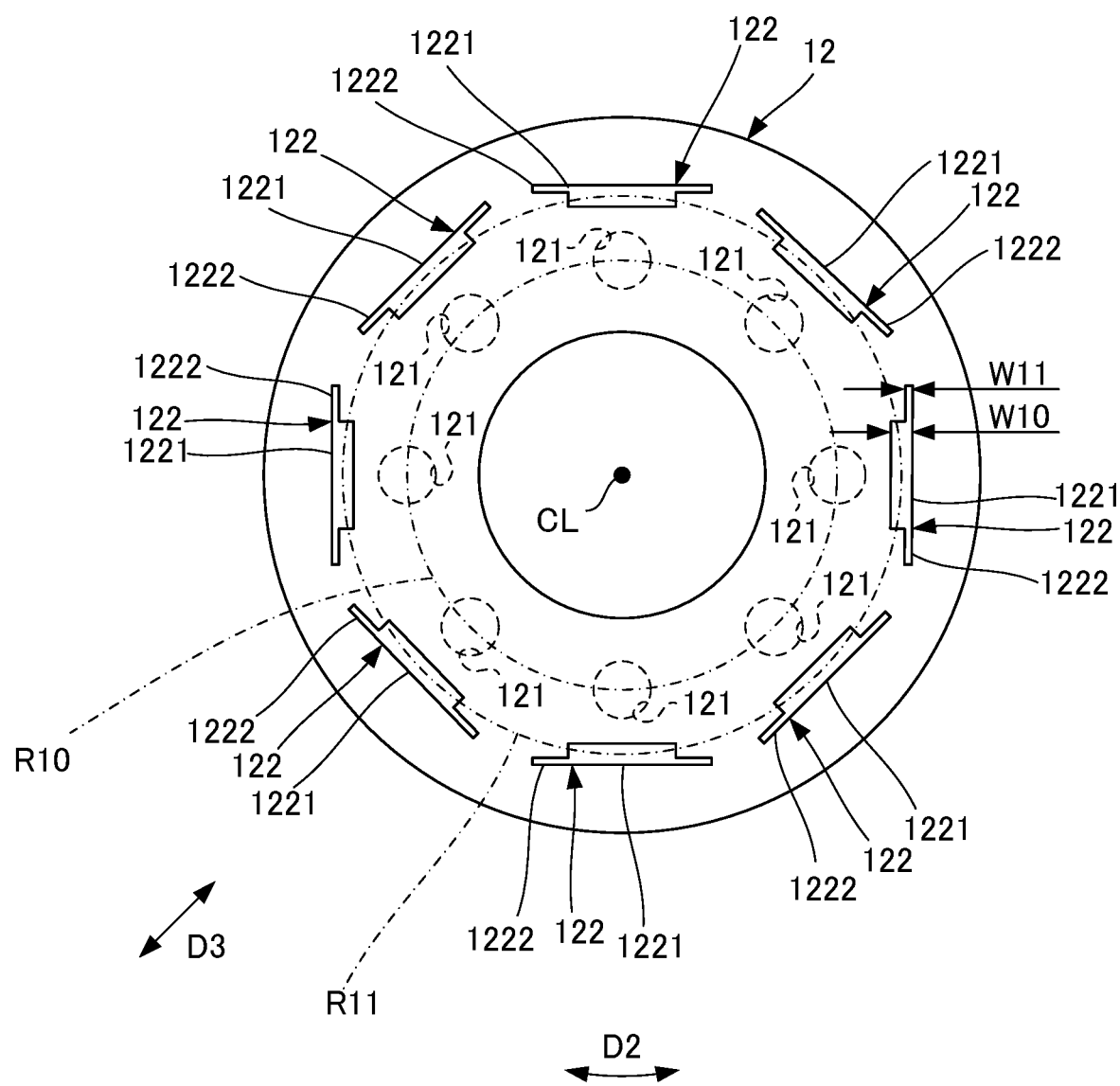
FIG. 3 is a front view of a first rotor core block included in a rotor.
Figure 4:
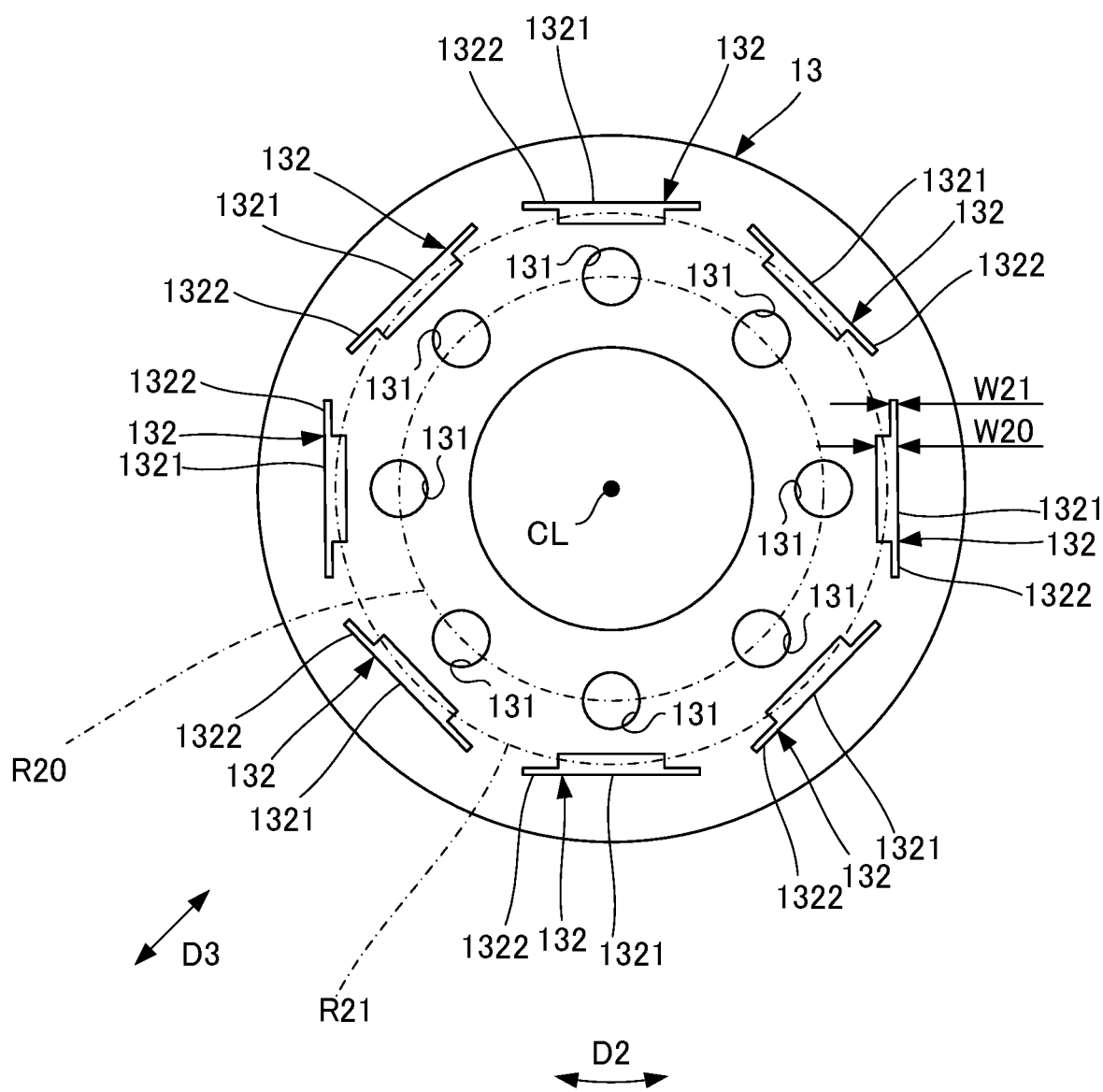
FIG. 4 is a front view of a second rotor core block included in the rotor.

FIG. 1 is a front view illustrating a schematic configuration of a motor 1 according to an embodiment of the present invention. FIG. 2 is a cross-sectional view along line A-A in FIG. 1. FIG. 3 is a front view of a first rotor core block 12 included in a rotor 10. FIG. 4 is a front view of a second rotor core block 13 included in the rotor 10.

A motor 1 of the present embodiment illustrated in FIGS. 1 and 2 includes a rotor 10 and a cylindrical stator 20 in which the rotor 10 is disposed. The motor 1 of the present embodiment is an interior permanent magnet (IPM) motor. The rotor 10 includes a rotary axis 11, a first rotor core block 12, a second rotor core block 13, a plurality of fixing pins 14, a plurality of magnets 15, and a resin 16.

The rotary axis 11 is a rod-shaped member. The rotary axis 11 is rotatably supported on a case (not illustrated) of the motor 1 via bearings (not illustrated) on both sides in an axial direction. That is, the rotary axis 11 is rotatable about a shaft center. In FIG. 2, a shaft center CL of the rotary axis 11 is indicated by a one-dot chain line. In the following description, an axial direction of the rotary axis 11 will be referred to simply as an "axial direction D1".

The first rotor core block 12 and the second rotor core block 13 are disposed to be adjacent in the axial direction D1 of the rotary axis 11 and are fixed to the rotary axis 11.

As illustrated in FIGS. 2 and 3, the first rotor core block 12 is cylindrical and includes a plurality of insertion portions 121 and a plurality of slots 122. The insertion portions 121 are disposed in an end surface in the axial direction D1 at intervals in a circumferential direction D2 and extend in the axial direction D1. The slots 122 are disposed on an outer side in a radial direction D3 than the insertion portions 121 at intervals in the circumferential direction D2 and extend in the axial direction D1.

As illustrated in FIGS. 2 and 4, the second rotor core block 13 is cylindrical and includes a plurality of insertion portions 131 and a plurality of slots 132. The insertion portions 131 are disposed in an end surface in the axial direction D1 at intervals in the circumferential direction D2 and extend in the axial direction D1. The slots 132 are disposed in an end surface of the axial direction D1 on an outer side in a radial direction D3 than the insertion portions 131 at intervals in the circumferential direction D2 and extend in the axial direction D1.

In the adjacent first and second rotor core blocks 12 and 13, the insertion portions 121 and 131 face each other and are successive to each other, and the slots 122 and 132 face each other and are successive each other.

The insertion portions 121 are formed as a bottomed hole extending in the axial direction D1 from an end surface of the first rotor core block 12 facing an end surface of the second rotor core block 13 and have a perfect circular shape when seen in the axial direction D1 and have substantially the same cross-sectional area. A plurality of insertion portions 121 are disposed at intervals in the circumferential direction D2 of the first rotor core block 12. In other words, the insertion portions 121 are disposed at approximately equal intervals on an imaginary circle R10 around the shaft center CL (the center of rotation of the first and second rotor core blocks 12 and 13) of the rotary axis 11. "Approximately equal intervals" include strictly equal intervals and intervals that can be regarded as functionally equal intervals (the same hereinbelow).

The insertion portions 131 are formed as a bottomed hole extending in the axial direction D1 from an end surface of the second rotor core block 13 facing an end surface of the first rotor core block 12 and have a perfect circular shape when seen in the axial direction D1 and have substantially the same cross-sectional area. A plurality of insertion portions 131 are disposed at intervals in the circumferential direction D2 of the second rotor core block 13. In other words, the insertion portions 131 are disposed at approximately equal intervals on an imaginary circle R20 around the shaft center CL of the rotary axis 11.

The slots 122 are formed as a hole that extends and passes from one end surface of the first rotor core block 12 to the other end surface in the axial direction D1 and have approximately the same cross-sectional area and have a slot body 1221 and a pair of ear portions 1222. The slot body 1221 when seen in the axial direction D1 has a rectangular shape that follows a cross-sectional shape when seen in the axial direction of the magnet 15.

As illustrated in FIG. 3, the pair of ear portions 1222 has a width W11 in the radial direction D3 smaller than a width W10 in the radial direction D3 of the slot body 1221 and extends in the circumferential direction D2 from a portion close to the outer side in the radial direction D3, of the end portion in the circumferential direction D2 of the slot body 1221. The slots 122 are disposed on the outer side in the radial direction D3 than the insertion portion 121 at intervals in the circumferential direction D2. In other words, a plurality of slots 122 are disposed around the shaft center CL of the rotary axis 11 on an imaginary circle R11 having a larger diameter than the imaginary circle R10 in which the insertion portion 121 is disposed. The slots 122 are disposed approximately at equal intervals on the imaginary circle R11. The slots 122 are disposed at positions corresponding to the same phases as the insertion portions 121 when the first rotor core block 12 is rotated.

The slots 132 are formed as a bottomed hole that extends in the axial direction D1 from an end surface of the second rotor core block 13 facing an end surface of the first rotor core block 12 and have approximately the same cross-sectional area and have a slot body 1321 and a pair of ear portions 1322. The slot body 1321 when seen in the axial direction D1 has a rectangular shape that follows a cross-sectional shape when seen in the axial direction of the magnet 15.

As illustrated in FIG. 4, the pair of ear portions 1322 has a width W21 in the radial direction D3 smaller than a width W20 in the radial direction D3 of the slot body 1321 and extends in the circumferential direction D2 from a portion close to the outer side in the radial direction D3, of an end in the circumferential direction D2 of the slot body 1321. The slots 132 are disposed on the outer side in the radial direction D3 than the insertion portion 131 at intervals in the circumferential direction D2. In other words, a plurality of slots 132 are disposed around the shaft center CL of the rotary axis 11 on an imaginary circle R21 having a larger diameter than the imaginary circle R20 in which the insertion portion 131 is disposed. The slots 132 are disposed approximately at equal intervals on the imaginary circle R21. The slots 132 are disposed at positions corresponding to the same phases as the insertion portions 131 when the second rotor core block 13 is rotated.

The fixing pin 14 is press-fitted to both insertion portions 121 and 131 facing each other in the axial direction D1 and fixes the adjacent first and second rotor core blocks 12 and 13. In the present embodiment, two fixing pins 14 are provided but not all insertion portions 121 and 131 are press-fitted. The fixing pins 14 are disposed approximately at equal intervals (in the present embodiment, 180°) on the imaginary circles R10 and R20. The fixing pin 14 is a spring pin or the like and has a C-shape when seen in the axial direction D1 and has elasticity in an orthogonal planar direction orthogonal to the axial direction D1.

The magnets 15 are inserted sequentially into the successive slots 122 and 132 and are disposed in the slots 122 and 132 to extend across the first and second rotor core blocks 12 and 13. The magnets 15 are inserted into all slots 122 and 132 and are disposed approximately at equal intervals on the imaginary circles R11 and R21. The magnets 15 have a rectangular shape such that the magnets 15 can be inserted into the slot bodies 1221 and 1321 when seen in the axial direction D1.

The resin 16 is filled into the slots 122 and 132 in which the magnets 15 are disposed and blocks the gap between the slots 122 and 132 and the magnet 15.

The stator 20 is fixed to the case (not illustrated) of the motor 1. The stator 20 includes a stator core 21 and a coil 22.

The stator core 21 is formed in an approximately cylindrical form. The stator core 21 is formed by stacking a plurality of electromagnetic steel sheets in the axial direction D1.

The coil 22 is wound around the stator core 21. The coil 22 is formed by coils 22 of U, V, and W-phases, for example. Portions protruding toward both sides in the axial direction D1 of the stator core 21 among the respective coils 22 are coil ends 23. In FIG. 1, a plurality of coils 22 are schematically illustrated in an integrated cylindrical form.

According to the rotor 10 and the motor 1 of the present embodiment, the following advantages are obtained, for example. The rotor 10 according to the present embodiment includes: a plurality of cylindrical rotor core blocks 12 and 13 disposed to be adjacent in an axial direction D1 of a rotary axis 11 and fixed to the rotary axis 11, the rotor core blocks 12 and 13 including insertion portions 121 and 131 disposed at intervals in an end surface in the axial direction D1 of the rotor core blocks 12 and 13 so as to extend in the axial direction D1, and slots 122 and 132 disposed on the outer side in the radial direction D3 than the insertion portions 121 and 131 at intervals in a circumferential direction D2 so as to extend in the axial direction D1, the insertion portions 121 and 131 of adjacent rotor core blocks 12 and 13 facing each other and being successive to each other, and the slots 122 and 132 facing each other and being successively each other; a plurality of fixing pins 14 having elasticity in an orthogonal planar direction orthogonal to the axial direction D1, the fixing pins being inserted in both insertion portions 121 and 131 facing each other in the axial direction D1 to fix the rotor core blocks 12 and 13 to be adjacent in an axial direction D1; and a plurality of magnets 15 disposed in the slots 122 and 132 to extend across the plurality of rotor core blocks 12 and 13.

When the rotor 10 is manufactured, the rotor core blocks 12 and 13 are rotated and stacked. Therefore, it is possible to decrease the number of steps as compared to a case in which a number of electromagnetic steel sheets are rotated and stacked. Moreover, since the magnet 15 is disposed to extend across the plurality of rotor core blocks 12 and 13, it is possible to decrease the number of steps as compared to a case in which magnets are disposed in the respective rotor core blocks 12 and 13. That is, according to the present embodiment, it is possible to provide the rotor 10 and the motor 1 capable of decreasing the number of steps during manufacturing.

Moreover, the rotor 10 includes the resin 16 filled into the slots 122 and 132 in which the magnets 15 are disposed to block a gap between the magnets 15 and the slots 122 and 132, the slots 122 and 132 include: the slot bodies 1221 and 1321 which, when seen in the axial direction D1, have a shape corresponding to a cross-sectional shape when seen in the axial direction D1 of the magnets 15 and in which the magnets 15 are disposed; and the ear portions 1222 and 1322 which have smaller widths W11 and W21 than the slot bodies 1221 and 1321 and extend in the circumferential direction D2 from an end in the circumferential direction D2 of the slot bodies 1221 and 1321 and in which the resin 16 is filled. Therefore, since the slots 122 and 132 have the ear portions 1222 and 1322, respectively, it is possible to easily arrange the magnet 15 in the slots 122 and 132 and to easily fill the resin 16 that blocks the gap between the magnet 15 and the slots 122 and 132.

Moreover, the insertion portions 121 and 131 have a perfect circular shape when seen in the axial direction D1, and the fixing pin 14 has a C-shape when seen in the axial direction D1. Therefore, even when the adjacent rotor core blocks 12 and 13 are connected with a minute shift, the rotor core blocks 12 and 13 are positioned about the shaft holes when the rotary axis 11 is press-fitted. The behavior in this process will be described below.

The first and second rotor core blocks 12 and 13 are positioned and connected in a temporarily fixed state using the insertion portions 121 and 131 and the fixing pin 14. However, due to a machining tolerance, the position of a shaft hole for the rotary axis 11 between the first and second rotor core blocks 12 and 13 may be shifted minutely. When the first and second rotor core blocks 12 and 13 are positioned completely in this shifted state, since the position of the shaft hole is not shifted, a problem may occur when the rotary axis 11 is inserted into the shaft hole. However, if the first and second rotor core blocks 12 and 13 are temporarily fixed using the fixing pin 14 having elasticity, the fixing pin 14 is deformed when the rotary axis 11 is inserted into the shaft hole and the position of the shaft hole is fixed following the rotary axis 11 between the first and second rotor core blocks 12 and 13. As a result, the plurality of core blocks are smoothly positioned about the rotary axis 11.

The present invention is not limited to the above-described embodiment and various changes and modifications can occur. For example, in the above-described embodiment, although the first and second rotor core blocks 12 and 13 are provided as a plurality of rotor core blocks, the plurality of rotor core blocks are not limited thereto. That is, the plurality of rotor core blocks is not limited to two rotor core blocks 12 and 13, and three or more rotor core blocks may be adjacent in the axial direction D1.

Moreover, in the above-described embodiment, although the insertion portions 121 and 131 are bottomed holes, the insertion portions are not limited thereto. That is, the insertion portion 121 may be a hole that passes from one end of the first rotor core block 12 toward the other end, and the insertion portion 131 may be a hole that passes from one end of the second rotor core block 13 toward the other end. The number of fixing pins 14 is not limited to two, and the fixing pins 14 may be inserted into all insertion portions, for example. The fixing pin 14 is not particularly limited as long as it has elasticity in the orthogonal planar direction. The insertion portion in which the fixing pin is inserted may be a hole in which a pin is inserted that passes through the entire rotor core which is conventionally used and may be a hole formed separately from the hole.

In the present embodiment, although the slot 132 is a bottomed hole, the slot 132 is not limited thereto. That is, the slot 132 may be a hole that passes from one end of the second rotor core block 13 toward the other end. Moreover, in a state in which the magnet 15 is inserted into the slots 122 and 132, the rotor core blocks 12 and 13 may be set on a mold for injection molding and a resin may be filled into the ear portions 1222 and 1322 which are holes for the resin so that the resin does not leak. After that, when the rotor core blocks 12 and 13 are removed from the mold, the resin is filled appropriately.

Figure 5:
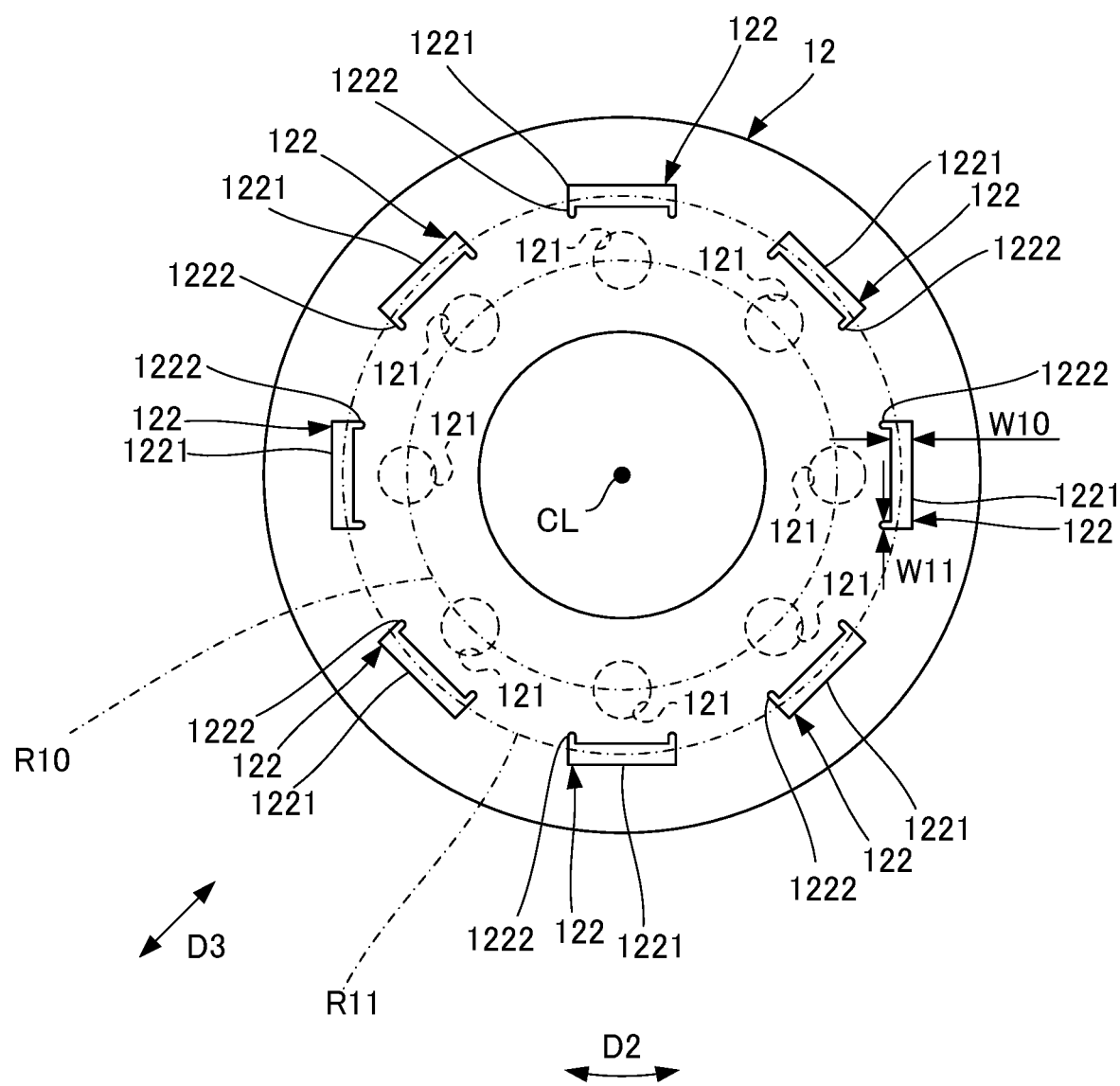
FIG. 5 is a front view (corresponding to FIG. 3) of a first rotor core block according to a modification.

In the above-described embodiment, although the ear portion extends in the circumferential direction D2 from a portion close to the outer side in the radial direction D3, of the end in the circumferential direction D2 of the slot body, the ear portion is not limited thereto. FIG. 5 is a front view (corresponding to FIG. 3) of a first rotor core block according to a modification. As illustrated in FIG. 5, the ear portion 1222 may extend toward the inner side in the radial direction D3 from a portion close to the inner side in the radial direction D3, of the end in the circumferential direction D2 of the slot body.

Specifically, as illustrated in FIG. 5, a pair of ear portions 1222 has a smaller width W11 in the circumferential direction D2 than a width W10 in the radial direction D3 of the slot body 1221 and extends toward the inner side in the radial direction D3 from a portion close to the inner side in the radial direction D3, of the end in the circumferential direction D2 of the slot body 1221. The pair of ear portions 1322 in the second rotor core block 13 has a similar configuration.

In the above-described embodiment, the slots 122 and 132 are disposed closer to the outer side in the radial direction D3 than the insertion portions 121 and 131, the slots 122 and 132 are not limited thereto. That is, the slots 122 and 132 may be disposed closer to the inner side in the radial direction D3 than the insertion portions 121 and 131. In the above-described embodiment, although the insertion portions 121 and 131 are disposed at intervals in the circumferential direction D2, the insertion portions 121 and 131 are not limited thereto. That is, the insertion portions 121 and 131 may be disposed at intervals in a direction other than the circumferential direction D2.

EXPLANATION OF REFERENCE NUMERALS

1: Motor
10: Rotor
11: Rotary axis
12: First rotor core block (Rotor core block)
121: Insertion portion
122: Slot
1221: Slot body
1222: Ear portion
13: Second rotor core block (Rotor core block)
131: Insertion portion
132: Slot
1321: Slot body
1322: Ear portion
14: Fixing pin
15: Magnet
16: Resin
CL: Shaft center
D1: Axial direction
D2: Circumferential direction
D3: Radial direction
R10, R11, R20, R21: Imaginary circle
W10, W11, W20, W21: Width

What is claimed is:

1. A rotor comprising: a plurality of cylindrical rotor core blocks disposed to be adjacent in an axial direction of a rotary axis and fixed to the rotary axis, the rotor core blocks including insertion portions disposed at intervals in an end surface in the axial direction of the rotor core blocks so as to extend in the axial direction, and slots disposed at intervals in a circumferential direction so as to extend in the axial direction, the insertion portions of the adjacent rotor core blocks facing each other and being successive to each other, and the slots of the adjacent rotor core blocks facing each other and being successive to each other;

a plurality of fixing pins having elasticity in an orthogonal planar direction orthogonal to the axial direction, the fixing pins being inserted to the both insertion portions facing each other in the axial direction to fix the rotor core blocks that are adjacent to each other in the axial direction; and a plurality of magnets disposed in the slots to extend across the plurality of rotor core blocks, wherein when seen in the axial direction, the fixing pins are disposed between a center of the rotary axis and the magnets in a radial direction.

2. The rotor according to claim 1, comprising: a resin filled into the slot in which the magnet is disposed to block a gap between the magnet and the slot, wherein the slot includes:

a slot body which, when seen in the axial direction, has a shape corresponding to a cross-sectional shape when seen in the axial direction of the magnet and in which the magnet is disposed; and an ear portion which has a smaller width than the slot body and extends in the circumferential direction or the radial direction from an end in the circumferential direction of the slot body and in which the resin is filled.

3. The rotor according to claim 1, wherein the insertion portion has a perfect circular shape when seen in the axial direction, and the fixing pin has a C-shape when seen in the axial direction.

4. A motor comprising: the rotor according to claim 1; and a cylindrical stator in which the rotor is disposed.

* * * * *